United States Patent [19]
Tropeano

[11] 3,982,771
[45] Sept. 28, 1976

[54] SAFETY GUARD ATTACHMENT FOR BICYCLES AND OTHER TWO-WHEEL VEHICLES

[76] Inventor: Thomas F. Tropeano, 12 Revere St., Lexington, Mass. 02173

[22] Filed: Feb. 18, 1975

[21] Appl. No.: 550,533

[52] U.S. Cl. .......................... 280/289 R; 40/129 C; 116/35 R; 248/477
[51] Int. Cl.² .......................................... B62J 5/20
[58] Field of Search ...................... 280/289; 116/35; 350/97; 248/43, 291, 477; 40/129 C

[56] References Cited
UNITED STATES PATENTS

| | | | |
|---|---|---|---|
| 1,291,625 | 1/1919 | Palmer | 116/35 R |
| 2,093,230 | 9/1937 | Brancati | 116/35 A |
| 2,153,634 | 4/1939 | Magarian | 350/97 |

FOREIGN PATENTS OR APPLICATIONS

| | | | |
|---|---|---|---|
| 924,266 | 8/1950 | France | 116/35 R |
| 1,115,198 | 4/1956 | France | 116/35 R |
| 1,303,470 | 8/1962 | France | 116/35 R |
| 964,417 | 8/1950 | France | 116/35 R |
| 950,224 | 9/1949 | France | 116/35 R |
| 1,152,306 | 2/1958 | France | 116/35 R |
| 831,646 | 2/1952 | Germany | 116/35 R |
| 834,957 | 3/1952 | Germany | 280/289 |
| 680,309 | 8/1939 | Germany | 280/289 |
| 193,817 | 10/1937 | Switzerland | 116/35 R |

*Primary Examiner*—M. H. Wood, Jr.
*Assistant Examiner*—Terrance L. Siemens
*Attorney, Agent, or Firm*—Munroe H. Hamilton

[57] ABSTRACT

A pivoting guard arm device is detachably mounted at one side of a two-wheel vehicle such as a bicycle. Mounting means secured to the bicycle holds the guard arm in a normally retracted position at one side of the bicycle. From its retracted position, the arm may be swung outwardly into laterally projecting relationship to that side of the bicycle exposed to passing traffic when operated on a highway or other thoroughfare. A reflector or other desired signalling means located on the outer end of the guard arm aids in indicating the presence of the bicycle to vehicles approaching from the rear and especially serves to indicate proximity of vehicles passing the bicycle so that a safe passing clearance may be more readily maintained. The mounting means may be attached at some desirable point on the bicycle body, and preferably may be engaged about the rear bicycle wheel shaft. Included in the mounting means is a bracket holder and a bracket component for adjustably supporting the arm in its several positions of adjustment.

2 Claims, 4 Drawing Figures

SAFETY GUARD ATTACHMENT FOR BICYCLES AND OTHER TWO-WHEEL VEHICLES

BACKGROUND OF THE INVENTION

The present invention is concerned with an improved signalling and guard device for a two-wheel vehicle such as a bicycle, and more particularly relates to a guard arm attachment which can be adjustably supported on a bicycle body at some desired point.

It is well-known in the art to equip a two-wheel vehicle such as a bicycle with reflector means as well as lighting units mounted at the rear of the bicycle in a position to provide a warning signal to other vehicles approaching from the rear. It is also customary to locate these signalling devices at varying heights. However, there has been no attempt in the art, so far as I am aware, to provide a guard element which swings outwardly into laterally projecting relationship to that side of a vehicle exposed to passing traffic.

SUMMARIZATION OF THE INVENTION

It is a chief object of the invention, therefore, to provide a safety guard arm attachment for a two-wheel vehicle such as a bicycle, and there has been devised a guard arm assembly including a guard arm and means for mounting the guard arm on a bicycle body in a retracted position from which it may be swung outwardly into laterally projecting relationship to that side of a bicycle exposed to passing traffic when operated on a highway or other thoroughfare.

It is also an object of the invention to provide a guard arm attachment of the class indicated with which may be associated a signalling member such as a light reflector or other indicating device.

DETAILED DESCRIPTION OF THE INVENTION

The safety guard attachment of the invention, in general, includes a pivoting guard arm and means for mounting the guard arm on the rear wheel shaft of a two-wheel vehicle such as a bicycle. The disclosure of the invention as hereinafter set forth will be made with reference to a bicycle of the foot pedal class, but is intended to apply to motor driven bicycles as well as motorcycles.

In a preferred form of the invention, the mounting means has been designed to hold the guard arm in a normally retracted upright position at one side of the bicycle, from which position the arm may be swung downwardly into laterally projecting relationship to the side of the bicycle exposed to passing traffic when the bicycle is operated on a highway or other thoroughfare. However, it is intended that this arrangement is illustrative of other arrangements in which the guard arm may, for example, be swung outwardly in a horizontal plane instead of a vertical plane.

Figure 1:
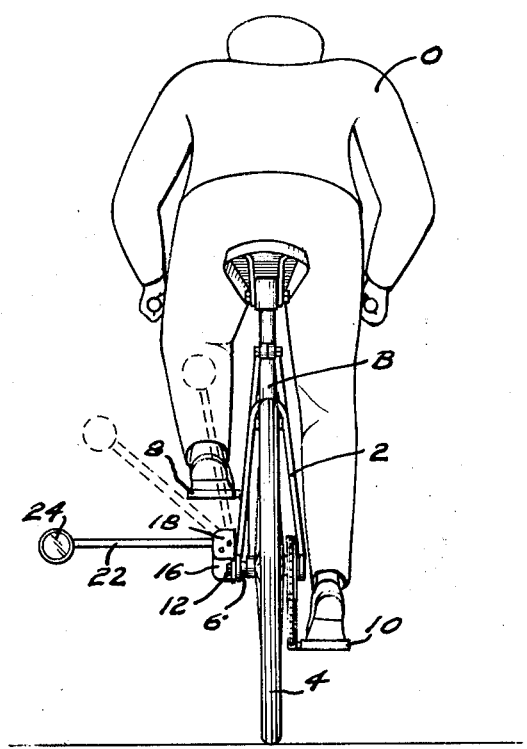
FIG. 1 is an elevational view of a two-wheel vehicle such as a bicycle being operated by a cyclist and further illustrating the guard arm attachment of the invention in varying positions of adjustment.

Referring more in detail to the drawings, FIG. 1 illustrates a bicycle B of conventional type including a bifurcated wheel support 2 in which is rotatably mounted a rear wheel 4. The wheel is mounted on a shaft 6 and is driven by pedals 8 and 10 actuated by an operator 0.

Figure 2:
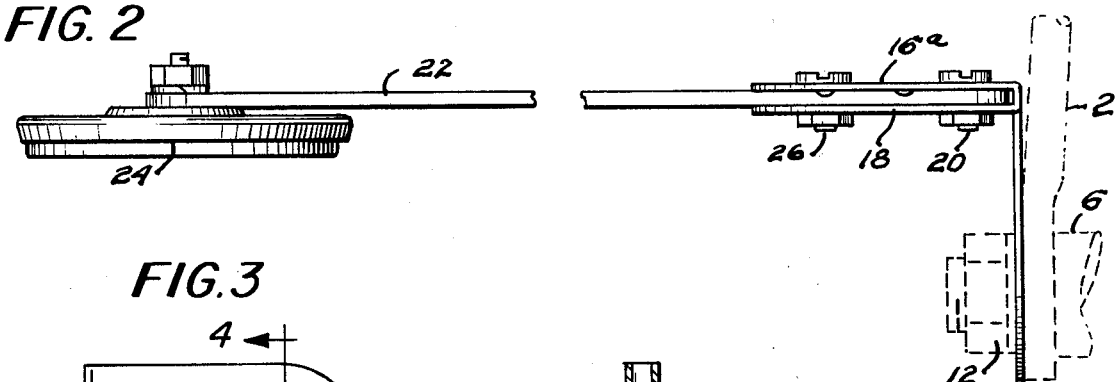
FIG. 2 is a fragmentary plan view of the attachment shown mounted on a vehicle wheel shaft indicated in dotted lines.
Figure 3:
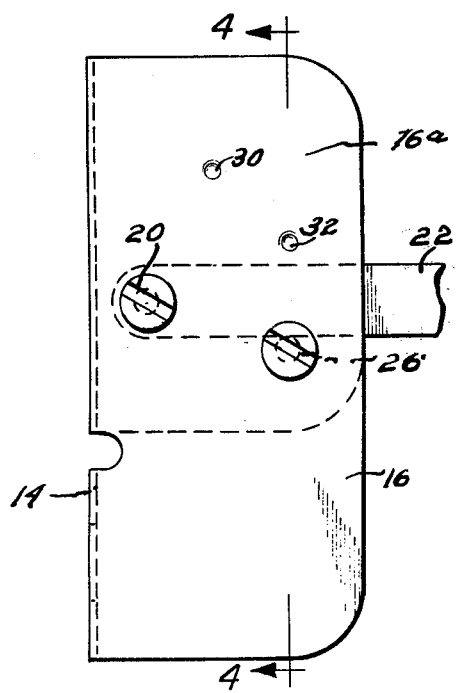
FIG. 3 is a side elevational view of the guard arm attachment indicating fragmentarily a guard arm element and a bracket structure for supporting the guard arm in varying positions of adjustment.

Solidly secured on the shaft 6 outside of the wheel 2 by means of a lock-nut 12 is a bracket holder member 14 which is of relatively thin, elongated shape and which is designed to be held in a forwardly projecting, horizontally-disposed position on the shaft. The bracket holder 14, at one end, is formed with a shaft opening 17 through which the shaft 6 may be received. At the opposite outer end of the holder 14 is supported a bracket structure 16 occurring in a right-angularly disposed position, as shown in FIG. 2. This bracket structure may be separately formed and attached to the holder 14, or as shown in the preferred embodiment of the drawings, may be constructed as an integral part of the bracket 14, as is more clearly shown in FIGS. 3 and 4. At an upper section the bracket includes an extension part 18 which is folded upon itself to lie in spaced relation to an adjacent upper section, 16a, of the bracket 16.

The bracket section 16a and its folded extension 18 are formed with openings through one of which is received a pivot element 20 about which are rotatably mounted a guard arm 22, and mounted at the outer end of the guard arm 22 is a signal device 24 which may, for example, comprise a reflector member. Also located through the section 16a and its folded part 18 is a stop element 26 which may consist of a bolt and nut assembly best shown in FIG. 4 and which is located in a position such that the guard arm 22 may be received thereagainst and supported in a horizontally disposed position as suggested in FIGS. 1 and 3.

Figure 4:
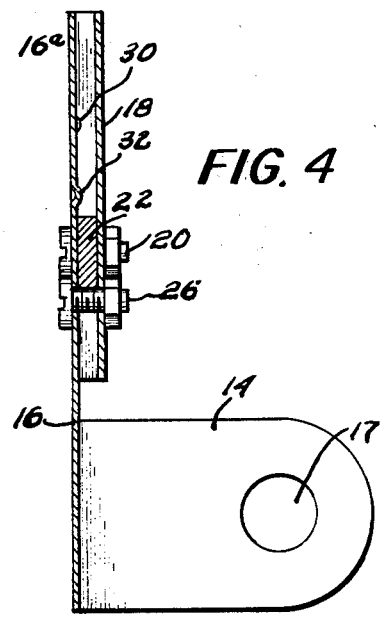
FIG. 4 is a cross section taken on the line 4—4 of FIG. 3.

Also formed in the bracket section 16a at the inner side thereof, as shown in FIG. 4, are detents 30 and 32 which are of a size and shape such that they may yieldably enage the guard arm 22 and hold it in the two positions of adjustment, best shown in dotted lines in FIG. 1. The engagement of the detents with the arm is controlled so that the arm may be readily moved down into an intermediate position or into a horizontally extending position by means of the operator at will.

The reflector 24 earlier referred to may be of the conventional type employing surfaces which reflect light directed thereagainst, or, if desired, the reflector body may include a battery receptacle in which is contained a small battery together with a bulb, suitable connection, and switching means for energizing the bulb when a constant light is desired to be in operation.

I claim:

1. Guard attachment for bicycles and the like comprising a guard arm and mounting means for supporting the arm in normally retracted positions at one side of a bicycle from which positions the arm may be swung outwardly into laterally projecting positions, said mounting means including a bracket holder engageable with the bicycle and a bracket device supported on the holder for releasably retaining the guard arm in the said position of adjustment, said bracket holder being formed with a shaft aperture for receiving a bicycle wheel shaft therethrough in secured relationship, said bracket device being constructed with spaced side walls having a pivot element located transversely therethrough for pivotally supporting the guard arm, a stop element transversely received through the side walls of the bracket device for rigidly holding the guard arm in a horizontally disposed position, and one of said side walls being formed with detent means for releasably supporting the guard arm in the said laterally projecting positions.

2. Guard attachment for a two-wheel vehicle of the class having a frame and forward and rearward wheels rotatably mounted in the frame in a position of substantial alignment, said guard attachment comprising a guard arm and attaching means for supporting the arm in a normally retracted position at one side of the frame from which position the arm may be swung outwardly into laterally projecting positions toward a passing traffic lane, said attaching means consisting of a body portion formed along one side thereof with an elongated bracket holder part, said bracket holder part having a shaft aperture at one end for receiving a bicycle wheel shaft therethrough in secured relationship to locate the bracket holder in substantially parallel spaced relation to the said frame of the vehicle, a bracket device formed integrally with the body portion and extending at right angles away from the front end of the bracket part and the vehicle frame, an upper section of the bracket device projecting above the elongated holder part and being turned upon itself to define spaced apart side walls, and means for pivotally supporting the guard arm between the said side walls.

* * * * *